Figure 1:
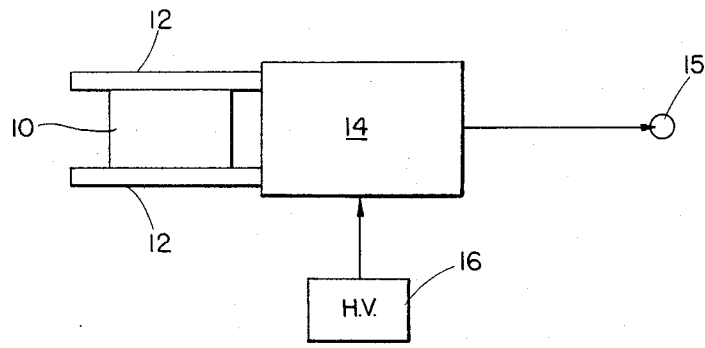

Jan. 3, 1967   R. M. MAIN   3,296,438
NUCLEAR PARTICLE DETECTION SYSTEM AND
CALIBRATION MEANS THEREFOR
Filed Aug. 12, 1963

INVENTOR.
ROBERT M. MAIN
BY
ATTORNEYS

United States Patent Office 3,296,438
Patented Jan. 3, 1967

3,296,438
NUCLEAR PARTICLE DETECTION SYSTEM AND
CALIBRATION MEANS THEREFOR
Robert M. Main, Oakland, Calif., assignor to Laboratory
For Electronics, Inc., Boston, Mass., a corporation of
Delaware
Filed Aug. 12, 1963, Ser. No. 301,302
6 Claims. (Cl. 250—71.5)

This invention relates in general to nuclear particle detection systems and in particular to a detection system having an energy response stabilization feature.

One of the primary requirements of a satisfactory nuclear particle detection system is that the output of the particle detector and its associated amplifying elements accurately represent the energy of an incident particle. This requirement is of basic importance in the area of radioactive isotope identification where the presence of the isotope can be determined by the energy of the radioactive particles emitted in its process of decay. These emitted particles have an energy spectrum which may be very narrow. Such measurements are usually made by a detector which provides output pulses having an amplitude proportional to the energy of the detected particles. Pulse height discriminator circuits then provide for selection of the desired energy range. The requirements of output accuracy and stability are also important where the spectrum of the incident radiation is being analyzed to determine how many counts fall within each unit of energy range, since any drift in the output will cause distortion of the frequency-energy plot. Finally, in the detection of low energy particles, the output signal may extend well into the electronic noise of the system; since pulse height discrimination may be used to eliminate the noise from consideration, slight variations in the detector output can result in a serious decrease in detection efficiency.

Particle detection systems in general suffer, however, from undesirable detector output variations due to changes, for example, in the operating conditions of the associated electronics, such as the photomultiplier high voltage supply and the pulse amplifiers. One common method of stabilizing such a system is to rely on extremely stable electronic elements. This solution to the problem is, however, very costly; in addition, the operation of the system is still limited to strictly controlled ambient conditions. Another method consists of the introduction of an artificial calibration signal into the system, as, for example, applying a pulsed light signal into the phototube. The production of a stable calibration signal requires, however, complicated and expensive circuitry; in addition, the signal itself is subject to variation over a sufficiently long span of time. This method has the further disadvantage that the primary element of the system, the particle detector itself, is not included in the calibration loop.

It is, therefore, the primary object of the present invention to provide new and improved apparatus and techniques for the stabilization of particle detection systems.

It is another object of the invention to provide calibration apparatus which does not require extremely stable electronic elements or complicated circuitry to produce a stable calibration signal.

It is a further object of the invention to provide calibration apparatus wherein the particle detector itself is an element in the calibration system.

It is still another object of the invention to provide stabilization apparatus and techniques in which the calibration process is semi-continuous, yet operates under any of a wide range of measurement conditions.

Broadly speaking, the present invention provides for the calibration of an energy responsive nuclear particle detection system by means of a combination of a calibration radioactive source and an auxiliary sensor in which the primary particle emitted by the calibration source such as an alpha or beta particle, is accompanied by a gamma ray of known energy. The gamma ray with its known energy is used as a calibration signal and is detected by the particle detector of the system. The primary particle is detected by the auxiliary sensor and is used to gate on a calibration analyzer which responds to the output pulse from the basic detector initiated by the calibration gamma ray. If desired, the auxiliary sensor may also be used to gate off the scaler unit of the system. The calibration analyzer is connected in a feedback circuit to adjust the gain of the particle detector and its associated amplifying elements in accordance with any difference between the energy as indicated by the measured pulse height and the known energy of the gamma ray.

Other objects of the present invention together with further features and advantages thereof will become apparent from the following detailed description in which:

FIG. 1 illustrates a preferred embodiment of the calibration source; and

Figure 2:
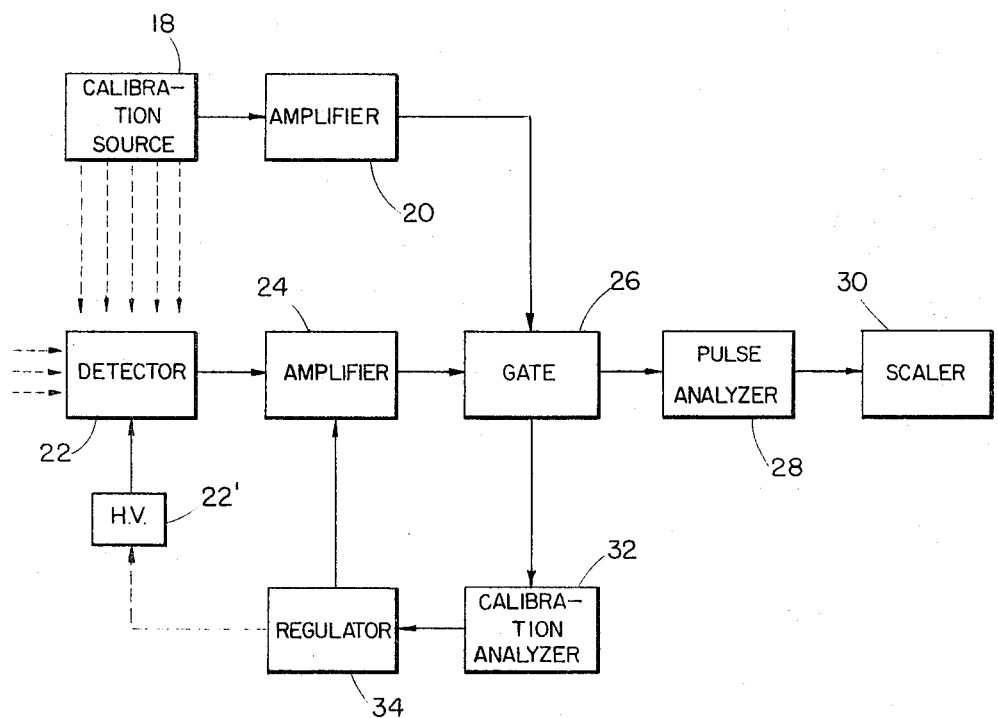

FIG. 2 diagrammatically illustrates a preferred embodiment of the present invention using the calibration source illustrated in FIG. 1.

In FIG. 1, the calibration radioactive source and auxiliary detector combination is shown. A radioactive source 10 is sandwiched between two detectors 12. The source 10 includes a radioactive isotope which, upon decaying, emits a primary particle followed (after approximately $10^{-9}$ sec.) by a gamma ray of known energy. As will be explained hereafter, the energy of the gamma ray remains precisely the same each time the isotope follows the same decay scheme. The detectors 12 are positioned for maximum interception of the alpha or beta particles emitted from the source 10 and are designed to stop substantially all the alpha or beta particles emitted from the source 10 while passing substantially all gamma rays emitted. The detectors 12 may be composed, for example, of scintillating material such as zinc sulphide (silver activated) for the detection of alpha particles, or of scintillating plastic for the detection of beta particles. A photomultiplier tube 14, connected to its high voltage supply 16, senses the light pulses emanating from the detectors 12 upon the interception of alpha or beta particles emitted from the source 10 and provides a signal corresponding thereto on an output terminal 15. In the foregoing description, other scintillating materials may be used such as stilbene, anthracene, $Zn_2SiO_4$ and NaI. The detectors 12 need not be scintillation detectors. Other solid state detectors, such as cadmium sulphide may be used, in which case, the photomultiplier may be eliminated and pulses from the detectors 12 may be provided directly to output terminal 15.

It is well established that during the decay of any radioactive isotope, energy is discretely emitted in the form of primary particles, such as alpha or beta particles, or radiation quanta, such as gamma rays, upon which emission the isotope either goes to a state of lower energy or is transformed into a different isotope. If any particular decay scheme is repeated, the exact same particles and/or radiation quanta are emitted with the energy of each such particle or radiation quantum being precisely the same as before. In addition, the decay scheme for any one isotope can be diagrammed and this particular decay scheme will repeat itself until the isotope is exhausted. Although a great many isotopes exist that follow more than one decay scheme (with varying degrees of probability), for the present invention an isotope can be chosen that has a single decay scheme or one with a high probability compared to competing schemes. Among the isotopes which can be used for the source 10 are: iodine–129 which emits a beta particle followed by a gamma ray having an energy of 40 kev.; americium 241 which emits an alpha particle followed by a gamma ray having an energy of 60 kev.; and plutonium 239 which emits an alpha particle followed by a gamma ray having an energy of 52 kev. These isotopes are well suited for use in the invention since they have a half-life greater than one year, and, upon the emission of an alpha or beta particle, go predominantly to a single excited level of their daughter products whereupon a gamma ray is emitted, that is, a gamma ray having predominantly a single fixed energy is emitted after the emission of the alpha or beta particle. The time lapse between the emission of the primary particle and the gamma ray is in the order of $10^{-9}$ seconds, which time may be considered substantially simultaneous for the electronic systems normally used. While many isotopes other than those mentioned above may be used in the radioactive source 10, for most efficient operation the various requirements set out above should be adhered to.

In FIG. 2, a complete embodiment of the detection system of the present invention is illustrated. In normal operation, a particle impinging upon particle detector 22 produces a signal pulse which is amplified by the variable linear amplifier 24 and sent through the normally open gate 26 to the pulse analyzer 28. The particle detector 22 may typically be formed of a scintillation crystal and photomultiplier tube. The photomultiplier tube both transforms the light pulse into an electrical pulse and also amplifies the electrical pulse, which may then be further amplified in an amplifier circuit 24. The pulse analyzer 28 is customarily designed (for isotope identification) to reject a signal pulse not having a magnitude within preselected limits; in addition, it may use pulse height discrimination to distinguish between nose in the system and an actual particle being detected. If the signal pulse is of proper and/or sufficient magnitude, a signal is sent to the scaler 30 which sums the output of the pulse analyzer 28.

In order to calibrate the particle detection system, the apparatus described in FIG. 1, now designated as calibration source 18, is positioned next to the particle detector 22 to ensure a high probability that the gamma ray accompanying the emitted primary particle strikes the particle detector 22. The photomultiplier tube 14 in response to the light pulse produced by the emission of the primary particle, sends a signal to amplifier 20 and thereupon to a gate 26 which, for a designated time thereafter (usually of the order of one microsecond), blocks all signal pulses going to the pulse analyzer 28 and gates on the calibration analyzer 32. The accompanying gamma ray is simultaneously detected by the particle detector 22 which sends a corresponding calibration pulse to amplifier 24 and thereupon to the calibration analyzer 32 via gate 26. In a scintillation crystal-photomultipler detector there will be a statistical variation in pulse height for gamma rays of the same energy. Since the calibration gamma ray has a known energy, the particle detector 22 (and its high voltage supply 22') and the amplifier 24 should produce in response to a number of these gamma rays a known average pulse height. If the average calibration pulse amplitude, as measured by analyzer 32, is not in accordance with the predetermined amplitude established upon initial calibration, a correction signal is sent out by the regulator 34 to adjust the gain of amplifier 24. In this manner, each time a primary particle is detected by the photomultiplier tube 14 followed by a gamma ray within a designated time interval, the resultant pulse contributes to a continuing calibration. The number of pulses with which the particle detection system is calibrated can be varied simply by changing the strength of the radioactive source; in addition, since the calibration source can be attached to the particle detector, the particle detection system can be semi-continuously monitored.

One arrangement by which the above calibration system may be implemented consists of using a single pulse height discriminator set on the high energy edge of the calibration gamma ray spectrum as the analyzer. This discriminator is arranged to pass only pulses of this maximum height. The output from this discriminator is then fed to a biased count ratemeter which may serve as regulator 34. The biased ratemeter will provide a voltage output proportioned to the number of pulses received by it from the analyzer 32. This voltage output from the regulator 34 can then be applied to control the high voltage supply 22, raising the value and hence the gain of the system when the output voltage from the ratemeter is low, and vice versa when the output voltage from the ratemeter is high.

When the overall measuring system includes a multi-channel discriminator as the pulse analyzer 28, then one channel of this unit may serve as the discriminator for the gain stabilization system.

The gate 26 is then arranged to provide the output of this channel to the regulator 34 in response to a gating pulse from the calibration source. When there is no gating pulse, the output of this channel is supplied to the scaler 30. If the frequency of sample pulses in this channel greatly exceeds the frequency of calibration pulses then it is possible not to gate off the scaler unit even for the calibration pulses.

While the invention has been described in terms of a gamma ray following a primary particle, many radioactive isotopes can be found which emit two successive particles nearly simultaneously and, as such, could be used as a radioactive source with slight modifications in the detector structure.

Having described the invention, it is apparent that numerous modifications and improvements may be made by those skilled in the art, all of which fall within the scope of the invention. Therefore, the invention herein disclosed should be construed to be limited only by the spirit and scope of the appended claims.

What is claimed is:

1. A particle detection system comprising: a detector element responsive to incident nuclear particles and providing output signals having a magnitude indicative of the energy of said incident particles; amplifier means coupled to said detector element for amplifying said detector element output signals; a radioactive calibration source characterized by emitting a primary particle and an accompanying gamma ray of known energy; said calibration source being positioned with respect to said detector element such that at least a portion of said accompanying gamma rays are incident upon it; a sensor element for detecting said primary particles and providing an output signal in response thereto, said sensor element being relatively insensitive to said accompanying gamma rays; analyzing means coupled to the output of said amplifying means and operative when said sensor element provides said output signal, said analyzing means providing an output indicative of the difference in magnitude between said amplified detector output signals for said accompanying gamma rays and a predetermined value for said accompanying gamma rays; and control means responsive to the output from said analyzing means for varying the gain of said amplifier means in a manner to reduce said difference to a minimum.

2. Apparatus in accordance with claim 1 and including a counter element coupled to the output of said amplifier means for summing the number of output pulses from said amplifier means not corresponding to gamma rays from said calibration source.

3. Apparatus in accordance with claim 2 and including a gating element controlled by output signals from said sensor element for passing pulses from said amplifier means only to said analyzing means when a signal is provided from said sensor element and for passing pulses from said amplifier means only to said counter element when there is no signal from said sensor element.

4. Apparatus in accordance with claim 1 wherein said detector element comprises a scintillation crystal and wherein said amplifier means includes a photomultiplier tube and a high voltage supply for said photomultiplier tube, the gain of said amplifier being varied by varying the value of high voltage supplied to said photomultiplier tube.

5. Apparatus in accordance with claim 4 wherein said analyzing means comprises: a discriminator circuit which passes pulses only above a predetermined level corresponding to the maximum pulse height produced by said scintillating crystal for said known energy; a count ratemeter for providing an output voltage indicative of the average number of pulses passed by said discriminator and means for providing pulses from said amplifier means to said discriminator only when said sensor element provides an output signal.

6. A particle detection system comprising: a detector element responsive to incident nuclear particles and providing output signals having a magnitude indicative of the energy of said incident particles; amplifier means coupled to said detector element for amplifying said detector element output signals and providing output pulses varying in amplitude in accordance with variations in the magnitude of said detector element output signals; a pulse height analyzer coupled to the output of said amplifier means, said pulse height analyzer having a plurality of channels, each of said channels passing only pulses falling within amplitude limits preset for the respective channels; scaler means coupled to the output of said pulse height analyzer for accumulating the number of pulses passed by each of said channels; a radioactive calibration source characterized by emitting a primary particle and an accompanying gamma ray of known energy, said calibration source being positioned with respect to said detector element such that at least a portion of said accompanying gamma rays are incident upon it; a sensor element for detecting said primary particles and providing an output signal in response thereto, said sensor element being relatively insensitive to said accompanying gamma rays; means responsive to said sensor element output signal for diverting the output of a selected one of said pulse height analysis channels away from said storage means, said selected channel being preset to pass pulses correpsonding to said known energy gamma ray under predetermined conditions; control means responsive to said diverted output from said selected pulse height channel for varying the gain of said amplifier means inversely in accordance with variations in the number of pulses on said diverted output.

References Cited by the Examiner
UNITED STATES PATENTS

| | | | |
|---|---|---|---|
| 3,091,463 | 5/1963 | Cohen et al. | 250—71.5 X |
| 3,109,096 | 10/1963 | Spaa | 250—106 X |
| 3,114,835 | 12/1963 | Packard | 250—106 X |
| 3,202,819 | 8/1965 | Christianson | 250—71.5 |

ARCHIE R. BORCHELT, *Primary Examiner.*

RALPH G. NILSON, *Examiner.*